United States Patent
Belcher et al.

(10) Patent No.: US 11,203,495 B2
(45) Date of Patent: Dec. 21, 2021

(54) SEQUENCING BULK MATERIAL CONTAINERS FOR CONTINUOUS MATERIAL USAGE

(71) Applicant: Halliburton Energy Services, Inc., Houston, TX (US)

(72) Inventors: Donald Anthony Belcher, Duncan, OK (US); Wesley John Warren, Marlow, OK (US); Bryan Chapman Lucas, Duncan, OK (US); Bryan John Lewis, Duncan, OK (US); Timothy Hunter, Duncan, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/765,915

(22) PCT Filed: Nov. 25, 2015

(86) PCT No.: PCT/US2015/062640
§ 371 (c)(1),
(2) Date: Apr. 4, 2018

(87) PCT Pub. No.: WO2017/091221
PCT Pub. Date: Jun. 1, 2017

(65) Prior Publication Data
US 2018/0305142 A1 Oct. 25, 2018

(51) Int. Cl.
*B65G 65/30* (2006.01)
*B65D 90/48* (2006.01)
(Continued)

(52) U.S. Cl.
CPC ............. *B65G 65/34* (2013.01); *B65D 88/26* (2013.01); *B65G 65/30* (2013.01); *B65D 90/48* (2013.01); *B65D 90/66* (2013.01)

(58) Field of Classification Search
CPC ........ B65D 65/34; B65D 88/26; B65D 90/48; B65D 90/66; B65G 65/40
(Continued)

(56) References Cited

U.S. PATENT DOCUMENTS

| 710,611 A | 10/1902 | Ray |
| 917,646 A | 4/1909 | Otto |

(Continued)

FOREIGN PATENT DOCUMENTS

| EP | 2937826 A1 | 10/2015 |
| GB | 2066220 A | 7/1981 |

(Continued)

OTHER PUBLICATIONS

International Search Report and Written Opinion issued in related PCT Application No. PCT/US2015/062640 dated Aug. 16, 2016, 15 pages.

(Continued)

*Primary Examiner* — Benjamin R Shaw
(74) *Attorney, Agent, or Firm* — John W. Wustenberg; Baker Botts L.L.P.

(57) ABSTRACT

In accordance with presently disclosed embodiments, systems and methods for sequencing portable containers of bulk material to provide continuous bulk material usage at an outlet are provided. The disclosed sequencing techniques may involve identifying a sequence for opening different portable containers of bulk material (or identifying the "next" portable container to open) and automatically actuating the discharge gates of the portable containers in the desired sequence to provide a continuous flow of bulk material to the outlet (e.g., blender unit). The identified sequence may be executed through a control system communicatively coupled to actuators used to open/close the discharge gates of the portable bulk material containers. A (Continued)

GUI may be communicatively coupled to the control system to allow an operator to select the desired sequence for execution by the control system and to display information regarding the portable bulk material containers.

20 Claims, 4 Drawing Sheets

(51) Int. Cl.
*G05B 11/00* (2006.01)
*B65G 65/34* (2006.01)
*B65D 88/26* (2006.01)
*B65D 90/66* (2006.01)

(58) Field of Classification Search
USPC .......................... 222/64; 414/299, 328, 329
See application file for complete search history.

(56) References Cited

U.S. PATENT DOCUMENTS

| | | |
|---|---|---|
| 1,519,153 A | 9/1923 | Mitton |
| 1,726,603 A * | 9/1929 | Wallace ............... B65G 69/00 414/299 |
| 1,795,987 A * | 3/1931 | Adams ................ B65G 69/00 414/299 |
| 2,231,911 A | 2/1941 | Hitt et al. |
| 2,281,497 A | 4/1942 | Hyson et al. |
| 2,385,245 A | 9/1945 | Willoughby |
| 2,415,782 A | 2/1947 | Zademach |
| 2,513,012 A | 6/1950 | Dugas |
| 2,563,470 A | 8/1951 | Kane |
| 2,652,174 A | 9/1953 | Shea |
| 2,670,866 A | 3/1954 | Glesby |
| 2,678,737 A | 5/1954 | Mangrum |
| 2,759,737 A | 8/1956 | Manning |
| 2,802,603 A | 8/1957 | McCray |
| 2,867,336 A | 1/1959 | Soldini et al. |
| 3,049,248 A | 8/1962 | Heltzel et al. |
| 3,083,879 A | 4/1963 | Coleman |
| 3,151,779 A | 10/1964 | Rensch et al. |
| 3,203,370 A | 8/1965 | Friedrich et al. |
| 3,217,927 A * | 11/1965 | Bale, Jr. ............... G01G 19/34 222/56 |
| 3,318,473 A | 5/1967 | Jones et al. |
| 3,326,572 A | 6/1967 | Murray |
| 3,343,688 A | 9/1967 | Ross |
| 3,354,918 A | 11/1967 | Coleman |
| 3,380,333 A | 4/1968 | Clay et al. |
| 3,404,963 A * | 10/1968 | Struble ................ B01F 1/0022 422/105 |
| 3,410,530 A | 11/1968 | Gilman |
| 3,432,151 A | 3/1969 | O'Loughlin |
| 3,467,408 A | 9/1969 | Emil |
| 3,476,270 A | 11/1969 | Cox et al. |
| 3,602,400 A | 8/1971 | Cooke |
| 3,627,555 A * | 12/1971 | Driscoll ............... B65G 53/06 106/472 |
| 3,698,693 A | 10/1972 | Poncet |
| 3,785,534 A | 1/1974 | Smith |
| 3,802,584 A | 4/1974 | Sackett, Sr. et al. |
| 3,986,708 A | 10/1976 | Heltzel et al. |
| 3,994,238 A | 11/1976 | Adler |
| 4,023,719 A | 5/1977 | Noyon |
| 4,029,470 A | 6/1977 | Wilkins et al. |
| 4,058,239 A | 11/1977 | Van Mill |
| 4,138,163 A * | 2/1979 | Calvert ................ B65D 88/26 406/129 |
| 4,178,117 A | 12/1979 | Brugler |
| 4,204,773 A | 5/1980 | Bates |
| 4,248,337 A * | 2/1981 | Zimmer ............... B65G 65/06 198/507 |
| 4,258,953 A | 3/1981 | Johnson |
| 4,313,708 A | 2/1982 | Tiliakos |
| 4,395,052 A | 7/1983 | Rash |
| 4,398,653 A | 8/1983 | Daloisio |
| 4,423,884 A | 1/1984 | Gevers |
| 4,544,279 A | 10/1985 | Rudolph |
| 4,548,507 A | 10/1985 | Mathis et al. |
| 4,583,663 A * | 4/1986 | Bonerb ................ B65D 88/62 222/136 |
| 4,626,166 A | 12/1986 | Jolly |
| 4,701,095 A | 10/1987 | Berryman et al. |
| 4,705,125 A | 11/1987 | Yamada et al. |
| 4,806,065 A | 2/1989 | Holt et al. |
| 4,850,702 A | 7/1989 | Arribau et al. |
| 4,856,681 A | 8/1989 | Murray |
| 4,900,157 A | 2/1990 | Stegemoeller et al. |
| 4,919,540 A | 4/1990 | Stegemoeller et al. |
| 4,956,821 A | 9/1990 | Fenelon |
| 4,993,883 A | 2/1991 | Jones |
| 4,997,335 A | 3/1991 | Prince |
| 5,036,979 A | 8/1991 | Selz |
| 5,096,096 A | 3/1992 | Calaunan |
| 5,114,169 A | 5/1992 | Botkin et al. |
| 5,149,192 A | 9/1992 | Hamm et al. |
| 5,303,998 A | 4/1994 | Whitlatch et al. |
| 5,339,996 A | 8/1994 | Dubbert et al. |
| 5,343,813 A | 9/1994 | Septer |
| 5,375,730 A | 12/1994 | Bahr et al. |
| 5,401,129 A | 3/1995 | Eatinger |
| 5,413,154 A | 5/1995 | Hurst, Jr. et al. |
| 5,426,137 A | 6/1995 | Allen |
| 5,441,321 A | 8/1995 | Karpisek |
| 5,443,350 A | 8/1995 | Wilson |
| 5,445,289 A | 8/1995 | Owen |
| 5,590,976 A | 1/1997 | Kilheffer et al. |
| 5,609,417 A | 3/1997 | Otte |
| 5,722,552 A | 3/1998 | Olson |
| 5,772,390 A * | 6/1998 | Walker ................ G01G 13/024 141/83 |
| 5,806,441 A * | 9/1998 | Chung ................. C09C 1/482 110/108 |
| 5,913,459 A | 6/1999 | Gill et al. |
| 5,915,913 A | 6/1999 | Greenlaw et al. |
| 5,927,356 A | 7/1999 | Henderson |
| 5,944,470 A | 8/1999 | Bonerb |
| 5,997,099 A | 12/1999 | Collins |
| 6,059,372 A | 5/2000 | McDonald et al. |
| 6,112,946 A * | 9/2000 | Bennett ................ B67D 1/0009 222/1 |
| 6,126,307 A | 10/2000 | Black et al. |
| 6,193,402 B1 | 2/2001 | Grimland et al. |
| 6,247,594 B1 | 6/2001 | Garton |
| 6,379,086 B1 * | 4/2002 | Goth ................... B29C 48/285 406/75 |
| 6,425,627 B1 | 7/2002 | Gee |
| 6,491,421 B2 | 12/2002 | Rondeau et al. |
| 6,517,232 B1 | 2/2003 | Blue |
| 6,536,939 B1 | 3/2003 | Blue |
| 6,537,015 B2 | 3/2003 | Lim et al. |
| 6,568,567 B2 | 5/2003 | McKenzie et al. |
| 6,622,849 B1 | 9/2003 | Sperling |
| 6,655,548 B2 * | 12/2003 | McClure, Jr. ........ G05D 11/133 222/132 |
| 6,876,904 B2 | 4/2005 | Oberg et al. |
| 6,980,914 B2 * | 12/2005 | Bivens ................. G01G 13/24 702/101 |
| 7,008,163 B2 | 3/2006 | Russell |
| 7,086,342 B2 | 8/2006 | O'Neall et al. |
| 7,100,896 B1 | 9/2006 | Cox |
| 7,114,905 B2 | 10/2006 | Dibdin |
| 7,252,309 B2 | 8/2007 | Eng Soon et al. |
| 7,284,579 B2 | 10/2007 | Elgan |
| 7,451,015 B2 | 11/2008 | Mazur et al. |
| 7,475,796 B2 | 1/2009 | Garton |
| 7,500,817 B2 | 3/2009 | Furrer et al. |
| 7,513,280 B2 * | 4/2009 | Brashears ............ B65D 88/28 141/100 |
| 7,665,788 B2 | 2/2010 | Dibdin et al. |
| 7,762,281 B2 | 7/2010 | Schuld |

(56) References Cited

U.S. PATENT DOCUMENTS

| | | | |
|---|---|---|---|
| 7,997,213 B1 | 8/2011 | Gauthier et al. | |
| 8,042,736 B2 | 10/2011 | Santucci et al. | |
| 8,387,824 B2 | 3/2013 | Wietgrefe | |
| 8,434,990 B2 | 5/2013 | Claussen | |
| D688,349 S | 8/2013 | Oren et al. | |
| D688,350 S | 8/2013 | Oren et al. | |
| D688,351 S | 8/2013 | Oren et al. | |
| D688,772 S | 8/2013 | Oren et al. | |
| 8,505,780 B2 | 8/2013 | Oren | |
| 8,545,148 B2 | 10/2013 | Wanek-Pusset et al. | |
| 8,573,917 B2 | 11/2013 | Renyer | |
| 8,585,341 B1 | 11/2013 | Oren | |
| 8,607,289 B2 | 12/2013 | Brown et al. | |
| 8,616,370 B2 | 12/2013 | Allegretti et al. | |
| 8,622,251 B2 | 1/2014 | Oren | |
| 8,662,525 B1 | 3/2014 | Dierks et al. | |
| 8,668,430 B2 * | 3/2014 | Oren | B65D 90/58 414/810 |
| D703,582 S | 4/2014 | Oren | |
| 8,827,118 B2 | 9/2014 | Oren | |
| 8,834,012 B2 | 9/2014 | Case et al. | |
| 8,887,914 B2 | 11/2014 | Allegretti et al. | |
| RE45,713 E | 10/2015 | Oren et al. | |
| 9,162,603 B2 | 10/2015 | Oren | |
| RE45,788 E | 11/2015 | Oren et al. | |
| 9,248,772 B2 | 2/2016 | Oren | |
| RE45,914 E | 3/2016 | Oren et al. | |
| 9,296,518 B2 | 3/2016 | Oren | |
| 9,340,353 B2 | 5/2016 | Oren et al. | |
| 9,358,916 B2 | 6/2016 | Oren | |
| 9,394,102 B2 | 7/2016 | Oren et al. | |
| 9,403,626 B2 | 8/2016 | Oren | |
| 9,421,899 B2 * | 8/2016 | Oren | B60P 1/56 |
| 9,440,785 B2 | 9/2016 | Oren et al. | |
| 9,446,801 B1 | 9/2016 | Oren | |
| 9,475,661 B2 | 10/2016 | Oren | |
| 9,511,929 B2 | 12/2016 | Oren | |
| 9,522,816 B2 | 12/2016 | Taylor | |
| 9,527,664 B2 | 12/2016 | Oren | |
| 9,580,238 B2 | 2/2017 | Friesen et al. | |
| RE46,334 E | 3/2017 | Oren et al. | |
| 9,617,065 B2 | 4/2017 | Allegretti et al. | |
| 9,617,066 B2 | 4/2017 | Oren | |
| 9,624,030 B2 | 4/2017 | Oren et al. | |
| 9,624,036 B2 | 4/2017 | Luharuka et al. | |
| 9,643,774 B2 | 5/2017 | Oren | |
| 9,650,216 B2 | 5/2017 | Allegretti | |
| 9,656,799 B2 | 5/2017 | Oren et al. | |
| 9,669,993 B2 | 6/2017 | Oren et al. | |
| 9,670,752 B2 | 6/2017 | Glynn et al. | |
| 9,676,554 B2 | 6/2017 | Glynn et al. | |
| 9,682,815 B2 | 6/2017 | Oren | |
| 9,694,970 B2 | 7/2017 | Oren et al. | |
| 9,701,463 B2 | 7/2017 | Oren et al. | |
| 9,718,609 B2 | 8/2017 | Oren et al. | |
| 9,718,610 B2 | 8/2017 | Oren | |
| 9,725,233 B2 | 8/2017 | Oren et al. | |
| 9,725,234 B2 | 8/2017 | Oren et al. | |
| 9,738,439 B2 | 8/2017 | Oren et al. | |
| RE46,531 E | 9/2017 | Oren et al. | |
| 9,758,081 B2 | 9/2017 | Oren | |
| 9,758,993 B1 | 9/2017 | Allegretti et al. | |
| 9,771,224 B2 | 9/2017 | Oren et al. | |
| 9,783,338 B1 | 10/2017 | Allegretti et al. | |
| 9,796,319 B1 | 10/2017 | Oren | |
| 9,796,504 B1 | 10/2017 | Allegretti et al. | |
| 9,809,381 B2 * | 11/2017 | Oren | B65D 90/587 |
| 9,828,135 B2 | 11/2017 | Allegretti et al. | |
| 9,840,366 B2 | 12/2017 | Oren et al. | |
| 9,969,564 B2 | 5/2018 | Oren et al. | |
| 9,988,182 B2 | 6/2018 | Allegretti et al. | |
| 10,059,246 B1 | 8/2018 | Oren | |
| 10,081,993 B2 | 9/2018 | Walker et al. | |
| 10,189,599 B2 | 1/2019 | Allegretti et al. | |
| 10,207,753 B2 | 2/2019 | O'Marra et al. | |
| 10,287,091 B2 | 5/2019 | Allegretti | |
| 10,308,421 B2 | 6/2019 | Allegretti | |
| 10,486,854 B2 | 11/2019 | Allegretti et al. | |
| 10,518,828 B2 | 12/2019 | Oren et al. | |
| 10,604,338 B2 | 3/2020 | Allegretti | |
| 2002/0121464 A1 * | 9/2002 | Soldwish-Zoole | B03B 13/00 209/156 |
| 2003/0159310 A1 | 8/2003 | Hensley et al. | |
| 2004/0008571 A1 | 1/2004 | Coody et al. | |
| 2004/0031335 A1 * | 2/2004 | Fromme | G01F 22/00 73/865 |
| 2004/0206646 A1 * | 10/2004 | Goh | B65G 9/182 206/321 |
| 2004/0258508 A1 * | 12/2004 | Jewell | B65B 1/06 414/328 |
| 2005/0219941 A1 | 10/2005 | Christenson et al. | |
| 2006/0013061 A1 * | 1/2006 | Bivens | B01F 15/00194 366/16 |
| 2007/0014185 A1 * | 1/2007 | Diosse | B01F 15/00344 366/9 |
| 2007/0201305 A1 | 8/2007 | Heilman et al. | |
| 2008/0187423 A1 | 8/2008 | Mauchle | |
| 2008/0294484 A1 | 11/2008 | Furman et al. | |
| 2009/0078410 A1 | 3/2009 | Krenek et al. | |
| 2009/0129903 A1 | 5/2009 | Lyons, III | |
| 2009/0292572 A1 | 11/2009 | Alden et al. | |
| 2009/0314791 A1 | 12/2009 | Hartley et al. | |
| 2010/0196129 A1 | 8/2010 | Buckner | |
| 2010/0319921 A1 | 12/2010 | Eia et al. | |
| 2012/0017812 A1 | 1/2012 | Renyer et al. | |
| 2012/0018093 A1 | 1/2012 | Zuniga et al. | |
| 2012/0037231 A1 | 2/2012 | Janson | |
| 2012/0181093 A1 * | 7/2012 | Fehr | G01G 13/18 177/103 |
| 2012/0219391 A1 * | 8/2012 | Teichrob | B65G 67/40 414/293 |
| 2013/0128687 A1 | 5/2013 | Adams | |
| 2013/0135958 A1 | 5/2013 | O'Callaghan | |
| 2013/0142601 A1 * | 6/2013 | McIver | B65D 88/30 414/288 |
| 2013/0206415 A1 | 8/2013 | Sheesley | |
| 2013/0284729 A1 | 10/2013 | Cook et al. | |
| 2014/0023463 A1 | 1/2014 | Oren | |
| 2014/0044508 A1 | 2/2014 | Luharuka et al. | |
| 2014/0076569 A1 | 3/2014 | Pham et al. | |
| 2014/0083554 A1 | 3/2014 | Harris | |
| 2014/0216736 A1 | 8/2014 | Leugemors et al. | |
| 2014/0305769 A1 * | 10/2014 | Eiden, III | B65D 88/12 198/443 |
| 2014/0377042 A1 | 12/2014 | McMahon | |
| 2015/0003955 A1 | 1/2015 | Oren et al. | |
| 2015/0013436 A1 | 1/2015 | Heaton et al. | |
| 2015/0016209 A1 | 1/2015 | Barton et al. | |
| 2015/0183578 A9 | 7/2015 | Oren et al. | |
| 2015/0191318 A1 | 7/2015 | Martel | |
| 2015/0284194 A1 | 10/2015 | Oren et al. | |
| 2015/0353293 A1 | 12/2015 | Richard | |
| 2015/0366405 A1 * | 12/2015 | Manchuliantsau | A61B 5/4504 222/1 |
| 2015/0368052 A1 | 12/2015 | Sheesley | |
| 2015/0375930 A1 | 12/2015 | Oren et al. | |
| 2016/0031658 A1 | 2/2016 | Oren et al. | |
| 2016/0039433 A1 | 2/2016 | Oren et al. | |
| 2016/0046438 A1 | 2/2016 | Oren et al. | |
| 2016/0046454 A1 | 2/2016 | Oren et al. | |
| 2016/0068342 A1 | 3/2016 | Oren et al. | |
| 2016/0130095 A1 | 5/2016 | Oren et al. | |
| 2016/0244279 A1 | 8/2016 | Oren et al. | |
| 2016/0332809 A1 | 11/2016 | Harris | |
| 2016/0332811 A1 | 11/2016 | Harris | |
| 2017/0021318 A1 * | 1/2017 | McIver | B65D 88/30 |
| 2017/0123437 A1 | 5/2017 | Boyd et al. | |
| 2017/0129696 A1 | 5/2017 | Oren | |
| 2017/0144834 A1 | 5/2017 | Oren et al. | |
| 2017/0203915 A1 | 7/2017 | Oren | |
| 2017/0217353 A1 | 8/2017 | Vander Pol et al. | |
| 2017/0217671 A1 | 8/2017 | Allegretti | |
| 2017/0225883 A1 | 8/2017 | Oren | |

(56) References Cited

U.S. PATENT DOCUMENTS

| | | |
|---|---|---|
| 2017/0240350 A1 | 8/2017 | Oren et al. |
| 2017/0240361 A1 | 8/2017 | Glynn et al. |
| 2017/0240363 A1 | 8/2017 | Oren |
| 2017/0267151 A1 | 9/2017 | Oren |
| 2017/0283165 A1 | 10/2017 | Oren et al. |
| 2017/0313497 A1 | 11/2017 | Schaffner et al. |
| 2017/0349226 A1 | 12/2017 | Oren et al. |
| 2018/0257814 A1 | 9/2018 | Allegretti et al. |
| 2019/0009231 A1* | 1/2019 | Warren .............. B01F 15/0235 |
| 2019/0111401 A1* | 4/2019 | Lucas ............... B01F 15/00415 |
| 2019/0241356 A1* | 8/2019 | Schaffner ............. B65D 90/582 |
| 2020/0062448 A1 | 2/2020 | Allegretti et al. |

FOREIGN PATENT DOCUMENTS

| | | |
|---|---|---|
| GB | 2204847 A1 | 11/1988 |
| JP | 2008239019 A | 10/2008 |
| WO | 2008012513 A2 | 1/2008 |
| WO | 2013142421 A1 | 9/2013 |
| WO | 2014018129 A1 | 1/2014 |
| WO | 2014018236 A2 | 5/2014 |
| WO | 2015119799 A1 | 8/2015 |
| WO | 2015191150 A1 | 12/2015 |
| WO | 2015192061 A1 | 12/2015 |
| WO | 2016044012 A1 | 3/2016 |
| WO | 2013095871 A1 | 6/2016 |
| WO | 2016160067 A1 | 10/2016 |

OTHER PUBLICATIONS

International Preliminary Report on Patentability in related PCT application No. PCT/US2015/062640 dated Jun. 1, 2018, 12 pages.
Office Action issued in Canadian Patent Application No. 2,996,055 dated Oct. 2, 2020, 5 pages.
U.S. Pat. No. 0802254A, filed Oct. 17, 1905, "Can-Cooking Apparatus," John Baker et al.

* cited by examiner

SEQUENCING BULK MATERIAL CONTAINERS FOR CONTINUOUS MATERIAL USAGE

CROSS-REFERENCE TO RELATED APPLICATION

The present application is a U.S. National Stage Application of International Application No. PCT/US2015/062640 filed Nov. 25, 2015, which is incorporated herein by reference in its entirety for all purposes.

TECHNICAL FIELD

The present disclosure relates generally to transferring bulk materials, and more particularly, to a method and computer system for sequencing the opening/closing of containers of bulk material for continuous material usage.

BACKGROUND

During the drilling and completion of oil and gas wells, various wellbore treating fluids are used for a number of purposes. For example, high viscosity gels are used to create fractures in oil and gas bearing formations to increase production. High viscosity and high density gels are also used to maintain positive hydrostatic pressure in the well while limiting flow of well fluids into earth formations during installation of completion equipment. High viscosity fluids are used to flow sand into wells during gravel packing operations. The high viscosity fluids are normally produced by mixing dry powder and/or granular materials and agents with water at the well site as they are needed for the particular treatment. Systems for metering and mixing the various materials are normally portable, e.g., skid- or truck-mounted, since they are needed for only short periods of time at a well site.

The powder or granular treating material (bulk material) is normally transported to a well site in a commercial or common carrier tank truck. Once the tank truck and mixing system are at the well site, the bulk material must be transferred or conveyed from the tank truck into a supply tank for metering into a blender as needed. Well sites typically include one or more supply tanks that are filled pneumatically on location and then connected to the blender through a series of belts (or auger conveyors in some marine applications). The supply tanks provide a large connected capacity of bulk material to be supplied to the blender. Discharge gates on the supply tanks output bulk material from the supply tanks to the conveyors, which then meter the bulk material to the blender.

Recent developments in bulk material handling operations involve the use of portable containers for transporting dry material about a well location. The containers can be brought in on trucks, unloaded, stored on location, and manipulated about the well site when the material is needed. The containers are generally easier to manipulate on location than a large supply tank trailer. However, the many separate containers do not provide a large connected capacity to the blender and, therefore, the containers must be changed out frequently to complete a wellbore treatment process. It is important to coordinate movement of such bulk material containers about the well site and the release of desired bulk materials from the containers into the blender to successfully perform the wellbore treatment.

BRIEF DESCRIPTION OF THE DRAWINGS

For a more complete understanding of the present disclosure and its features and advantages, reference is now made to the following description, taken in conjunction with the accompanying drawings, in which.

DETAILED DESCRIPTION

Figure 1:
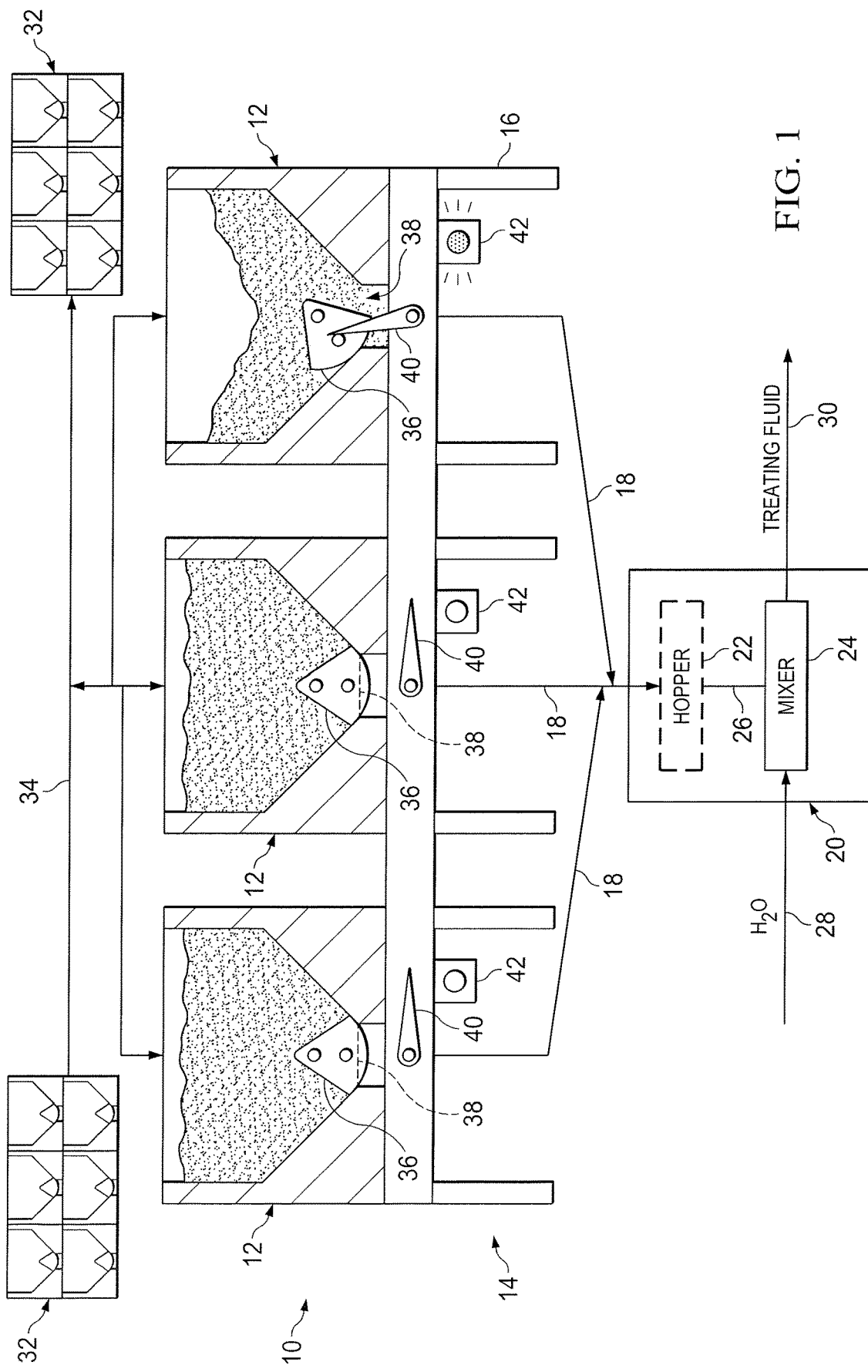
FIG. 1 is a schematic block diagram of a bulk material handling system suitable for sequencing between containers of bulk material to provide a continuous material flow to a blender, in accordance with an embodiment of the present disclosure.

Illustrative embodiments of the present disclosure are described in detail herein. In the interest of clarity, not all features of an actual implementation are described in this specification. It will of course be appreciated that in the development of any such actual embodiment, numerous implementation specific decisions must be made to achieve developers' specific goals, such as compliance with system related and business related constraints, which will vary from one implementation to another. Moreover, it will be appreciated that such a development effort might be complex and time consuming, but would nevertheless be a routine undertaking for those of ordinary skill in the art having the benefit of the present disclosure. Furthermore, in no way should the following examples be read to limit, or define, the scope of the disclosure.

Certain embodiments according to the present disclosure may be directed to systems and methods for efficiently managing bulk material (e.g., bulk solid or liquid material). Bulk material handling systems are used in a wide variety of contexts including, but not limited to, drilling and completion of oil and gas wells, concrete mixing applications, agriculture, and others. The disclosed embodiments are directed to systems and methods for efficiently delivering bulk material from a plurality of bulk material containers into a blender inlet of a blender unit at a job site. Disclosed embodiments may include a method and computer system for scheduling and timing the sequence of bulk material containers for outputting bulk material directly into the blender inlet. The disclosed techniques may be used to efficiently handle any desirable bulk material having a solid or liquid constituency including, but not limited to, sand, proppant, gel particulate, diverting agent, dry-gel particulate, liquid additives, acid, chemicals, cement, and others.

In currently existing on-site bulk material handling applications, dry material (e.g., sand, proppant, gel particulate, or dry-gel particulate) may be used during the formation of treatment fluids. In such applications, the bulk material is often transferred between transportation units, storage tanks, blenders, and other on-site components via pneumatic transfer, sand screws, chutes, conveyor belts, and other components. Recently, a new method for transferring bulk material to a hydraulic fracturing site involves using portable containers to transport the bulk material. The containers can be brought in on trucks, unloaded, stored on location, and manipulated about the site when the material is needed. These containers generally include a discharge gate at the bottom that can be actuated to empty the material contents of the container at a desired time.

Discharge gates on these containers are manually operated to output the bulk material from the container toward a blender inlet. In general, only a few containers of bulk material are connected to the blender at any time to provide connected capacity. As a result, the time and method of sequencing between containers can be an important design feature, especially as the containerized bulk material management system is used in more operationally complex jobs (e.g., having larger bulk material use rates or more types of bulk material used during the job). There is little or no room for operator error when moving, opening, and closing the many bulk material containers at a well site in a coordinated manner.

The disclosed systems and methods for sequencing the output of bulk material from multiple containers are designed to address and eliminate the shortcomings associated with existing container handling systems. Specifically, the disclosed sequencing techniques may include identifying a sequence for opening different portable containers (or identifying the "next" portable container to open) and automatically actuating the discharge gates of the portable containers in the desired sequence to provide a continuous flow of bulk material to the outlet (e.g., blender unit). The sequencing control may be applied through a control system communicatively coupled to actuators used to open/close the discharge gates of the portable bulk material containers.

In some embodiments, the gate actuators may be included as part of a support structure, and the bulk material containers may be removably disposed on the support structure such that the same actuators interface with different bulk material containers disposed on the structure at different times. That way, when one container is emptied, it may be removed from the structure and replaced with a new full container.

A graphical user interface (GUI) may be communicatively coupled to the control system, allowing an operator to specify the desired sequence for execution by the control system. The GUI may output one or more alerts if the operator selects a "next" container that is not physically in place to be opened (i.e., not positioned on the support structure) at a predetermined time. The GUI may also display information regarding the portable bulk material containers, such as which container is currently open and the amount of time remaining before the container is emptied.

The disclosed sequencing method may decrease the likelihood that a job failure could occur due to timing errors by a system operator. The timing of discharge gate actuation on the many bulk material containers at the well site is important for enabling the job to continue as desired. Using the disclosed automated sequencing, the bulk material handling system may effectively switch between an emptied container and a full bulk material container without an operator having to manually switch between the two. That way, if a situation occurs at the well site that might distract the operator during the time that a container is fully emptying, the automated system ensures that the next container is opened in sufficient time to continue the supply of bulk material to the blender.

In addition, the disclosed sequencing system and method provides active notification of the need to remove empty containers and replace them with full containers throughout the well treatment process. This active notification helps the well treatment process continue as desired when quick timing is needed for container switching and replacement on site. This may be the case, for example, toward the end of a stage of the well treatment process when proppant usage is at its highest rate.

Turning now to the drawings, FIG. 1 is a block diagram of a bulk material handling system 10. The system 10 includes one or more containers 12 elevated on a support structure 14 and holding a quantity of bulk material (e.g., solid or liquid treating material). The containers 12 may each utilize a gravity feed to provide a controlled, i.e. metered, flow of bulk material at an outlet 18. The containers 12 are separate from each other and independently transportable about the job site (e.g., for placement on or removal from the support structure 14).

In the illustrated embodiment, the support structure 14 may include a frame 16 for receiving and holding the containers 12 and a plurality of gravity feed outlets 18 for directing bulk material away from the respective containers 12. The outlets 18 may be coupled to and extend from the frame 16. The outlets 18 may utilize a gravity feed to provide a controlled, i.e. metered, flow of bulk material from the containers 12 to a blender unit 20.

Although shown as just one support structure 14 in FIG. 1, other embodiments of the bulk material handling system 10 may include one or more bulk material containers 12 disposed on separate support structures 14 that all feed into the blender unit 20. For example, the support structures 14 may each hold a single container 12. In other embodiments, the support structures 14 may each hold multiple containers 12. In still other embodiments, one support structure 14 may hold a single container 12 while another support structure 14 holds multiple containers.

As illustrated, the blender unit 20 may include a hopper 22 and a mixer 24 (e.g., mixing compartment). The blender unit 20 may also include a metering mechanism 26 for providing a controlled, i.e. metered, flow of bulk material from the hopper 22 to the mixer 24. However, in other embodiments the blender unit 20 may not include the hopper 22, such that the outlets 18 of the support structure 14 may provide bulk material directly into the mixer 24.

Water and other additives may be supplied to the mixer 24 (e.g., mixing compartment) through a fluid inlet 28. As those of ordinary skill in the art will appreciate, the fluid inlet 28 may include more than the one input flow line illustrated in FIG. 1. The bulk material and water may be mixed in the mixer 24 to produce (at an outlet 30) a hydraulic fracturing fluid, a mixture combining multiple types of proppant, proppant/dry-gel particulate mixture, sand/sand-diverting agents mixture, cement slurry, drilling mud, a mortar or concrete mixture, or any other fluid mixture for use on location. The outlet 30 may be coupled to a pump for transporting the treating fluid to a desired location (e.g., a hydrocarbon recovery well) for a treating process.

It should be noted that the disclosed containers 12 may be utilized to provide bulk material for use in a variety of treating processes. For example, the disclosed systems and methods may be utilized to provide proppant materials into fracture treatments performed on a hydrocarbon recovery well. In other embodiments, the disclosed techniques may be used to provide other materials (e.g., non-proppant) for diversions, conductor-frac applications, cement mixing, drilling mud mixing, and other fluid mixing applications.

As illustrated, the containers 12 may be elevated above an outlet location via the frame 16. The support structure 14 is designed to elevate the containers 12 above the level of the blender inlet (e.g., blender hopper 22 and/or mixing tub 24) to allow the bulk material to gravity feed from the containers 12 to the blender unit 20. This way, the containers 12 are able to sit on the frame 16 of the support structure 14 and output bulk material directly into the blender unit 20 via the gravity feed outlets 18 of the support structure 14. In some embodiments, the support structure 14 (with the frame 16 and the gravity feed outlets 18) may be integrated into the blender unit 20. In this manner, the system 10 may be a single integrated unit for receiving one or more containers 12 on the support structure 14, feeding bulk material from the containers 12 to the blender inlet, and mixing the bulk material with one or more fluids at the mixer 24 to produce the treatment fluid.

Although shown as supporting three containers 12, other embodiments of the frame 16 may be configured to support other numbers (e.g., 1, 2, 4, 5, 6, 7, 8, or more) of containers 12. The exact number of containers 12 that the support structure 14 can hold may depend on a combination of factors such as, for example, the volume, width, and weight of the containers 12 to be disposed thereon.

In any case, the containers 12 may be completely separable and transportable from the frame 16, such that any container 12 may be selectively removed from the frame 16 and replaced with another container 12. That way, once the bulk material from one container 12 runs low or empties, a new container 12 may be placed on the frame 16 to maintain a steady flow of bulk material to an outlet location. In some instances, a container 12 may be closed before being completely emptied, removed from the frame 16, and replaced by a container 12 holding a different type of bulk material to be provided to the outlet location.

It should be noted that the disclosed system 10 may be used in other contexts as well. For example, the bulk material handling system 10 may be used in concrete mixing operations (e.g., at a construction site) to dispense aggregate from the containers 12 through the outlets 18 into a concrete mixing apparatus (blender 20). In addition, the bulk material handling system 10 may be used in agriculture applications to dispense grain, feed, seed, or mixtures of the same. Still other applications may be realized for transporting bulk material via containers 12 to an elevated location on a support structure 14 and dispensing the bulk material in a metered fashion through the outlets 18.

A portable bulk storage system 32 may be provided at the site for storing one or more additional containers 12 of bulk material to be positioned on the frame 16 of the support structure 14. The bulk material containers 12 may be transported to the desired location on a transportation unit (e.g., truck). The bulk storage system 32 may be the transportation unit itself or may be a skid, a pallet, or some other holding area. One or more containers 12 of bulk material may be transferred from the storage system 32 onto the support structure 14, as indicated by arrow 34. This transfer may be performed by lifting the container 12 via a hoisting mechanism, such as a forklift, a crane, or a specially designed container management device.

When the one or more containers 12 are positioned on the support structure 14, discharge gates 36 on one or more of the containers 12 may be opened, allowing bulk material to flow from the containers 12 into the respective outlets 18 of the support structure 14. The outlets 18 may then route the flow of bulk material directly into a blender inlet (e.g., into the hopper 22 or mixer 24) of the blender unit 20.

After one or more of the containers 12 on the support structure 14 are emptied, the empty container(s) 12 may be removed from the support structure 14 via a hoisting mechanism. In some embodiments, the one or more empty containers 12 may be positioned on another bulk storage system 32 (e.g., a transportation unit, a skid, a pallet, or some other holding area) until they can be removed from the site and/or refilled. In other embodiments, the one or more empty containers 12 may be positioned directly onto a transportation unit for transporting the empty containers 12 away from the site. It should be noted that the same transportation unit used to provide one or more filled containers 12 to the location may then be utilized to remove one or more empty containers 12 from the site.

As illustrated, the containers 12 may each include a discharge gate 36 for selectively dispensing or blocking a flow of bulk material from the container 12. In some embodiments, the discharge gate 36 may include a rotary clamshell gate, as shown. However, other types of discharge gates 36 that can be actuated open and closed may be used. When the discharge gate 36 is closed, as shown on the left-hand and centrally positioned containers 12A and 12B, the gate 36 may prevent bulk material from flowing from the corresponding container 12 to the outlet 18. The discharge gate 36 may be selectively actuated into an open position (as shown on the right-hand positioned container 12C) to release the bulk material from the container 12 into the corresponding outlet 18. When rotary clamshell gates are used, this actuation may involve rotating the discharge gate 36 about a pivot point relative to the container 12 to uncover an opening 38 at the bottom of the container 12, thereby allowing bulk material to flow through the opening 38 and into the outlet 18. When linearly actuated gates are used, this actuation may involve linearly translating the discharge gate 36 relative to the container 12 to uncover the opening 38. When it is desired to stop the flow of bulk material, or once the container 12 is emptied, the discharge gate 36 may then be actuated (e.g., rotated or translated) back to the closed position to block the flow of bulk material.

In some embodiments, the support structure 14 may include one or more actuators 40 used to actuate the discharge gates 36 of whatever containers 12 are positioned on the support structure 14. The one or more actuators 40 may be entirely separate from the containers 12 and their corresponding discharge gates 36. That is, the one or more actuators 40 and the discharge gates 36 may not be collocated on the same structure. The same actuators 40 may be used to open and/or closed the discharge gates 36 of multiple containers 12 that are positioned on the support structure 14 over time. The one or more actuators 40 may be rotary actuators, linear actuators, or any other desired type of actuators for engaging and moving the discharge gates 36 of the containers 12 between closed and open positions. The actuators 40 may be automated and, in some instances, may allow for manual override of the automated system.

The support structure 14 may also include one or more indicators 42 (e.g., indicator lights) disposed on the support structure 14 for providing various information about the operating state of the support structure 14 and/or the containers 12 disposed thereon. For example, in the illustrated embodiment, the support structure 14 may include at least one indicator 42 corresponding to each actuator 40 on the support structure 14. The indicators 42 may include lights designed to indicate whether the discharge gates 36 of the containers 12 disposed on the support structure 14 are in an open position or in a closed position, based on the operating state of the corresponding actuators 40.

Figure 2:
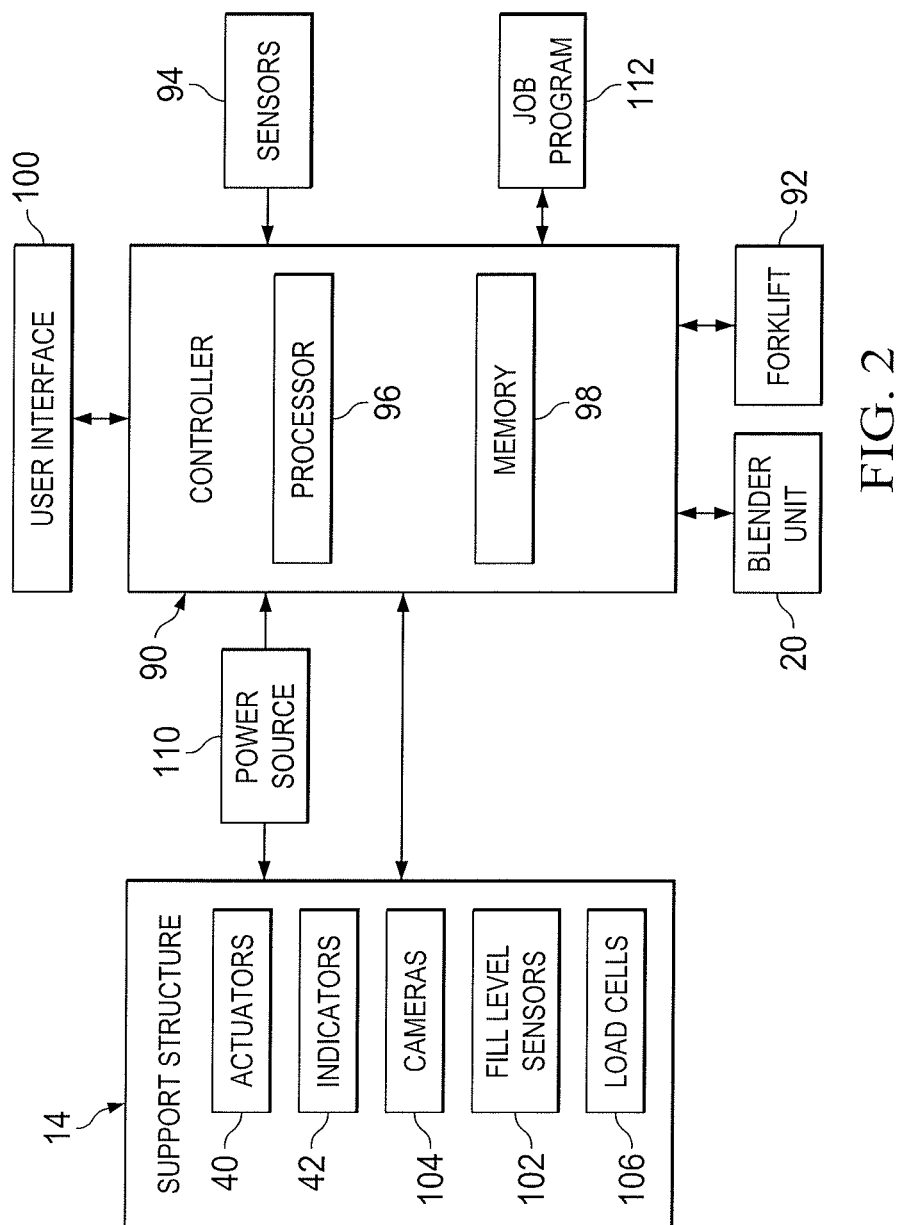
FIG. 2 is a schematic block diagram of a control system and related electronics for sequencing the bulk material containers of FIG. 1, in accordance with an embodiment of the present disclosure.

In presently disclosed embodiments, the bulk material handling system 10 may utilize a control system for controlling actuation of the discharge gates 36 of the containers 12 on the support structure 14. More specifically, the control system may control discharge gate sequencing, system message reporting to an operator, and data processing for various calculations used in the gate sequencing and bulk material handling processes. FIG. 2 is a block diagram illustrating one such control system 90 used in conjunction with the support structure 14 and various other on-site components to control sequencing of bulk material containers and other processes.

In the illustrated embodiment, the portable support structure 14 may include a number of electronic components, and these components may be communicatively coupled (e.g., via a wired connection or wirelessly) to one or more controllers 90 (e.g., automated control system) at the well site. The control system 90 may be communicatively coupled to several other well site components including, but not limited to, the blender unit 20, a hoisting mechanism (e.g., forklift) 92, and various sensors 94.

The control system 90 utilizes at least a processor component 96 and a memory component 98 to monitor and/or control various operations and bulk material inventory at the well site. For example, one or more processor components 96 may be designed to execute instructions encoded into the one or more memory components 98. Upon executing these instructions, the processors 96 may provide passive logging of the operational states of one or more components at the well site, as well as the amount, type, and location of bulk materials at the well site. In some embodiments, the one or more processors 96 may execute instructions for controlling operations of certain well site components (e.g., support structure electronics, blender unit 20, hoisting mechanism 92, etc.). This may help to control placement of containers about the well site, sequencing of discharge gates on the bulk material containers, and other operations related to bulk material transfer at the well site.

As shown, the processors 96 may be coupled to a graphical user interface (GUI) 100, which enables an operator to input instructions for execution by the control system 90. The control system 90 may output certain control signals to well site components based on the commands received from an operator at the GUI 100. In this manner, the operator may be able to operate the bulk material handling system with relative ease.

The GUI 100 may also output data relating to the operational state of the bulk material handling system. For example, the GUI 100 may provide an operator with information about each container that is disposed on the support structure 14 at any time. In addition, the GUI 100 may output alerts to the operator in response to unexpected or undesirable events encountered during operation of the bulk material handling system.

The GUI 100 may be configured to run on a rugged touch screen tablet with a wireless connection to the control system 90. However, the GUI 100 may be run on other platforms as well. For example, the GUI 100 may be implemented on a smartphone in wireless communication with the control system 90, or on a larger computing device coupled to the control system 90 via a wired or wireless connection.

As shown, the control system 90 may be communicatively coupled to a number of sensors disposed on the support structure 14 and/or about the well site. Based on feedback from these sensors, the control system 90 may determine when to actuate discharge gates to switch between different bulk material containers that are positioned on the support structure 14. The control system 90 may also be communicatively coupled to a number of controllable components disposed on the support structure 14, the blender unit 20, and/or the forklift 92. The control system 90 may actuate certain of these controllable components based on sensor feedback.

The support structure 14 itself may include a number of electronic components such as, for example, the automated actuators 40 described above with reference to FIG. 1. These actuators 40 may be controlled to open and/or close a discharge gate of one or more containers elevated on the support structure 14. The support structure 14 may also include one or more indicators 42 (e.g., indicator lights) disposed on the support structure for providing various information about the operating state of the support structure 14. For example, in the embodiment shown in FIG. 1, the support structure 14 may include at least one indicator 42 corresponding to each automated actuator 40 on the support structure 14. The indicators 42 may include lights designed to indicate whether the discharge gates of containers disposed on the support structure 14 are in an open position or in a closed position, based on the operating state of the corresponding actuators 40.

In addition, the support structure 14 may include various sensors designed to take measurements and provide sensor feedback to the control system 90. For example, the support structure 14 may include fill level sensors 102 (e.g., guided wave radar sensors, sonar sensors, array or level switches, or any other type of level sensing devices) pointed toward the blender hopper or individual outlet chutes and used to detect a level of the bulk material present in the hopper and/or chutes. The controller 90 may output control signals to one or more actuators 40 on the support structure 14 to initiate filling of the blender hopper with additional bulk material from one or more containers on the support structure 14, based on the received fill level sensor signals. That is, when the blender hopper is running low, the controller 90 may actuate another one or more containers into the open position to maintain a steady flow of bulk material to the blender hopper. As discussed in detail below, the control system 90 may actuate the discharge gates on different containers with precisely controlled timing based on the received sensor feedback.

The support structure 14 may also include cameras 104 (e.g., all-weather cameras) to provide optical feedback of certain operations occurring near the support structure 14. One or more cameras may be positioned to look into the blender inlet (e.g., hopper) or the individual outlet chutes to determine a level of bulk material in these components. The cameras 104 may also be used as a back up to the fill level sensors 102 to confirm whether a container, chute, or hopper has fully emptied.

Cameras 104 may also be positioned on the support structure 14 to look out toward where the hoisting mechanism 92 is manipulated to engage the portable support structure 14 or containers being lifted onto the support structure 14. These cameras 104 may detect a proximity of the hoisting mechanism 92 (and/or the hoisted container) relative to the support structure 14 as the hoisting mechanism 92 is maneuvered proximate the support structure 14. The controller 90 may output signals to control an alignment of the hoisting mechanism (e.g., forklift) 92 with certain interface features on the support structure, based on the optical feedback received from the cameras 104. Once aligned with the support structure 14, the hoisting mechanism 92 may be used to position the container as desired onto the support structure 14, or to lift and transport the support structure 14 itself about the well site.

The support structure 14 may also include load cells 106 (or other sensors) for detecting the presence and/or weight of the one or more containers disposed on the frame of the support structure 14. By detecting the weight of the containers, the load cells 106 may provide the controller 90 with information regarding the number of containers disposed on the support structure 14 as well as the fill level of bulk material within the individual containers on the support structure 14. When fewer than the maximum capacity of containers are disposed on the support structure 14, the controller 90 may output a command for an operator or automated system to position a new filled container of bulk material onto the support structure 14, based on the received signal from the load cells 106.

The controller 90, the support structure electronics, or both, may utilize power from an external power source 110, as shown. In other embodiments, the support structure 14 may include its own power source 110 for operating the onboard electronics and sensors.

As mentioned above, the controller 90 may be communicatively coupled to various other sensors 94 disposed about the well site (e.g., on components other than the support structure 14). In some embodiments, these sensors 94 may include one or more load cells or bin full switches for tracking a level of bulk material in a portable container and indicating whether the container is empty, full, or partially full. Such sensors 94 may be used for any given container, the blender hopper, a silo (not shown), or any other component at the well site. In addition, in some embodiments the sensors 94 may include RFID tags used to provide an indication of the particle size, bulk volume, weight, type, material, and/or supplier of the bulk material disposed in a certain container. In such instances, the controller 90 may be communicatively coupled to an RFID reader disposed in proximity to the containers being moved about the well site.

The control system 90 and GUI 100 may be used to provide automated sequencing of the discharge gates for releasing bulk material in a steady flow from the portable containers. The controller 90 may provide control signals to the actuators 40 used to open and/or close the container discharge gates according to a desired schedule. The term "sequencing" may refer to determining an order in which the system will automatically open the containers on the support structure to release their bulk material into the blender unit, and to close the containers once they are empty or once a desired amount of material has been output to the blender unit. In some embodiments, this sequence may be selected such that only one container at a time is opened to output bulk material to the blender unit. In other embodiments, the sequence may be selected such that multiple containers are opened to output bulk material to the blender unit at the same time.

The GUI 100 may enable an operator to schedule the sequence in which the containers disposed on the support structure 14 are to be actuated to release their bulk material to the blender. For example, the GUI 100 may allow an operator to make selections of the "next" container (or multiple containers) to be opened in the sequence, or to select a list of several containers to be individually opened in a selected order.

In other embodiments, a desired job program 112 may be provided to the controller 90, or selected from a list of several available job programs 112 via operator inputs to the GUI 100. The job program 112 may include a predetermined sequence for opening/closing discharge gates and placing/replacing portable containers on the support structure 14 in accordance with a desired treatment operation. Once the job program 112 is populated into the control system 90, the control system 90 may provide fully automated control of the bulk material handling processes in accordance with the treatment schedule. That is, the control system 90 may select the specific sequence of bulk material containers based on the job program 112 and sensor feedback indicative of the type, size, and/or weight of bulk material in the available on-site containers.

In some instances, the control system 90 may output signals to the hoisting mechanism 92 indicating which containers to remove and/or place on the support structure 14 at a given time. The control system 90 may also output signals to the actuators 40 for opening/closing the discharge gates on the containers with appropriate timing for maintaining a steady supply of bulk material to the blender unit 20. The control system 90 may also provide alerts through the GUI or other means to well site operators as needed.

The GUI 100 and control system 90 may enable processes other than selecting and enacting a desired portable container sequence. In some embodiments, the GUI 100 may provide information to an operator regarding how the bulk material handling system is performing with relation to other well site job processes. In some embodiments, the control system 90 may compare sensor feedback from a number of different well site components to provide error checking. For example, the control system 90 may compare a detected blender sand rate (i.e., rate of use of bulk material as measured at the blender) with the rate of change of container weight (as measured by load cells 106). The GUI 100 may display an alert when an error between these different measurements is detected, or when the detected values are outside an acceptable window of operation.

Figure 3:
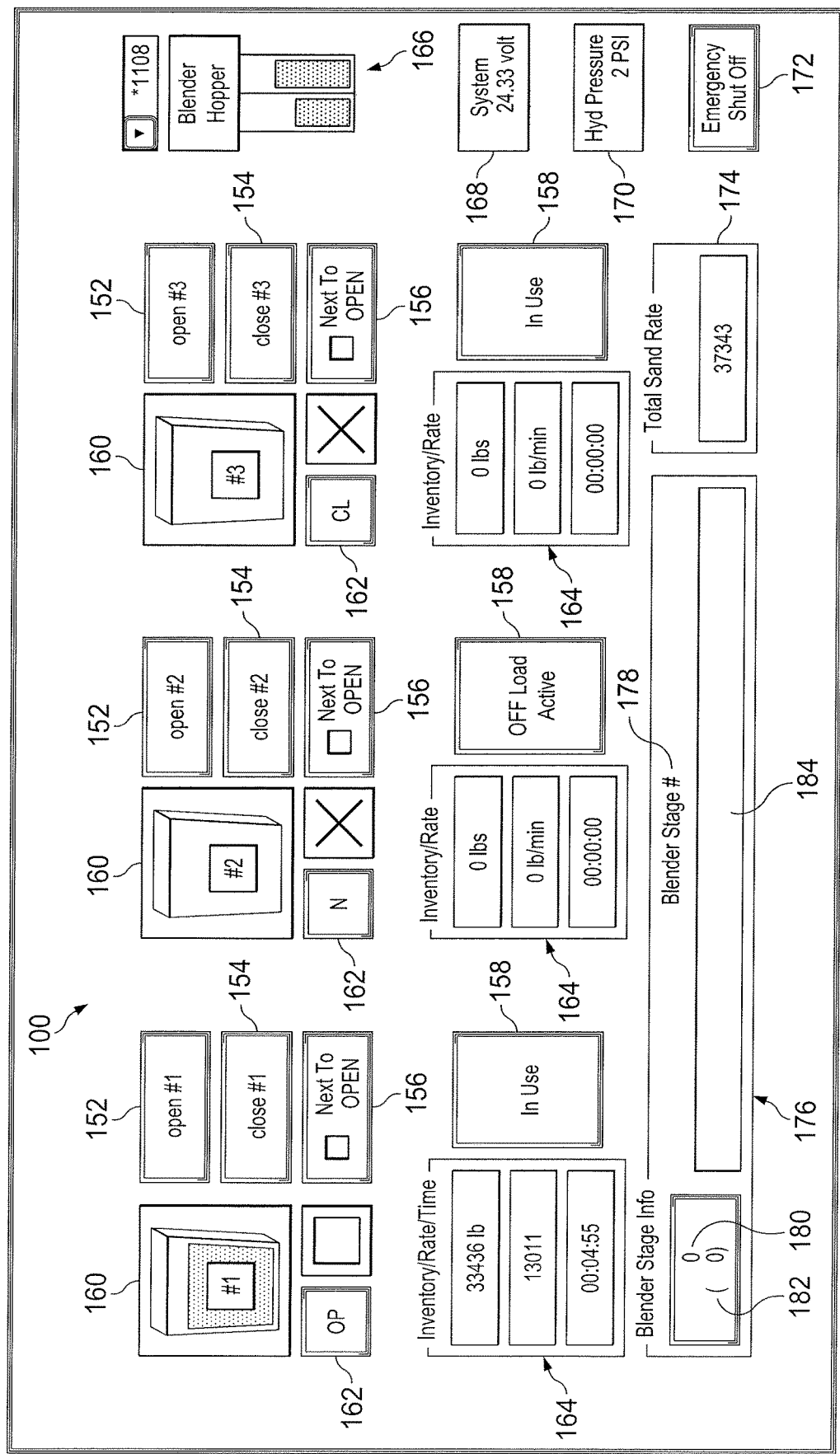
FIG. 3 is a screen view of a graphical user interface (GUI) for selecting a sequence of bulk material containers, in accordance with an embodiment of the present disclosure.

FIG. 3 illustrates a display that may be provided on the GUI 100 for controlling and/or monitoring the bulk material handling process, in accordance with an embodiment of the present disclosure. As shown, the GUI 100 may include various control buttons for selection by an operator, as well as several notification displays for informing the operator of a status of the material handling equipment. As shown, the GUI 100 may include an "open" button 152, a "close" button 154, a "next to open" button 156, an in-use/off-load status button 158, a container fill level icon 160, an open/neutral/closed status indicator 162, and an inventory/rate/time indication 164 for each container (or each position on the support structure designed to receive a container).

Other embodiments of the GUI 100 may include different arrangements of control/monitoring features (e.g., buttons, displays, indications) associated with each container than are shown in the illustrated embodiment. For example, in embodiments where a preselected treatment schedule can be provided to the control system, the GUI 100 may include additional indicators corresponding to the treatment schedule. In addition, the number of sets of these control/monitoring features (e.g., 152, 154, 156, 158, 160, 162, and 164) may be different in embodiments where a different number of containers are used, or the support structure is designed to hold a different number of containers.

The "open" and "close" buttons 152 and 154 may be selected by an operator to initiate opening and closing, respectively, of the discharge gate associated with a particular container. The "next to open" button 156 may be selected by an operator to identify the next container (or multiple containers) to be opened in the sequence. In this manner, the GUI 100 enables an operator to make the next selection in the sequence of bulk material containers emptying into the blender unit.

The sequence that is selected via the GUI 100 may be implemented automatically via the controller (e.g., 90 of FIG. 2), thereby decreasing the likelihood that a job failure could occur due to timing errors by a system operator. The timing of discharge gate actuation on the bulk material containers (e.g., 12 of FIG. 1) is important for enabling the job to continue as desired. Using the automated sequencing enabled through the controller and GUI 100, the bulk material handling system may effectively switch between an emptied container and a full bulk material container without the operator having to be attentive when the switch occurs. That way, if the operator is distracted during the time that a container is fully emptying, the controller ensures that the next container in the sequence is opened in sufficient time to continue the supply of bulk material to the blender.

The in-use/off-load status button 158 enables an operator to select a state for each container, or position on the support structure that could receive a container. The in-use/off-load status button 158 allows the operator to select either an "in use" status or an "off load active" status for each container (or container position). The "in use" status may indicate that the corresponding container is currently open and in use to provide a flow of bulk material to the blender unit. The "off load active" status, when selected, informs a hoisting mechanism operator and other uses that the selected position on the support structure is either ready for loading with a new container or ready for unloading of a present container. The in-use/off-load status button 158 may correspond to the indicators (42 of FIGS. 1 and 2) on the support structure designed to prevent a hoisting mechanism operator from removing a container that is open and in use. The in-use/off-load status button 158 may automatically turn from "off load active" to "in use" when the corresponding gate actuator is engaged, not in a neutral or return position.

The container fill level icon 160 may provide a visual indication of the approximate fill level of bulk material within the associated container. The open/neutral/closed status indicator 162 generally notifies the operator whether each of the containers is open, closed, or in a neutral position (for loading/unloading) at a certain time.

The inventory/rate/time indication 164 may indicate the amount of inventory (i.e., amount of bulk material) available in each container based on the weight of the container, as measured by one or more load cells (e.g., 106 of FIG. 2). The indication 164 may also display a rate of change of the inventory in each container by tracking the change in weight over time. The indication 164 may further display a time component, which represents the predictive time remaining for the container to fully empty at the current rate.

Other indications displayed on the GUI 100 may include a blender hopper level 166 indicative of the amount of bulk material in the blender hopper, as determined by fill level sensor feedback (e.g., measured by sensors 94 of FIG. 2). The GUI 100 may also include a system voltage indication 168 and hydraulic pressure indication 170 to provide electric and hydraulic power levels of the unit. The GUI 100 may further include an "emergency shut off" button 172 for ending the bulk material handling operations and/or shutting off the unit. In addition, the GUI 100 may include a "Total Sand Rate" display 174 that shows the combined sand rate discharge provided from the containers on the support structure (or the totality of containers feeding into the blender).

The GUI 100 may also include a blender stage information display 176 that provides information about the blender operation, e.g., compared to a pre-selected blender program. The blender stage information display 176 may include a blender active stage number 178 that identifies a particular job program that is being run on the blender. The blender stage information display 176 may also include pump volume indicators 180 and 182. The pump volume indicator 180 may indicate the active volume of slurry, fluid, or sand actually that has been pumped during the stage of blender operation. The pump volume indicator 182 may indicate the total programmed volume of slurry, fluid, or sand to be pumped during that stage of blender operation, according to the pre-selected blender job program. Further, the blender stage information display 176 may include a plot area 184 for displaying, for example, a bar graph (not shown) or some other plot representing the active volume of fluid pumped (180) as a function or percentage of the programmed volume (182).

As described herein, an operator may use the GUI 100 of FIGS. 2 and 3 to manually sequence and initiate gate actuations of any desirable container on the support structure 14. Additional manual override techniques may also be available using, for example, manual hydraulic, pneumatic, or mechanical controls. For example, an operator may manually open and/or close valves that are part of the hydraulic actuation system on the support structure to actuate discharge gates of different containers on the structure. In addition, an operator may manually open and/or close the discharge gates directly using, for example, a mechanical lever inserted through a portion of the gate. These manual override techniques may allow the bulk material handling system to continue to operate during a temporary time in the event that other electrical, hydraulic, or control components malfunction.

Figure 4:
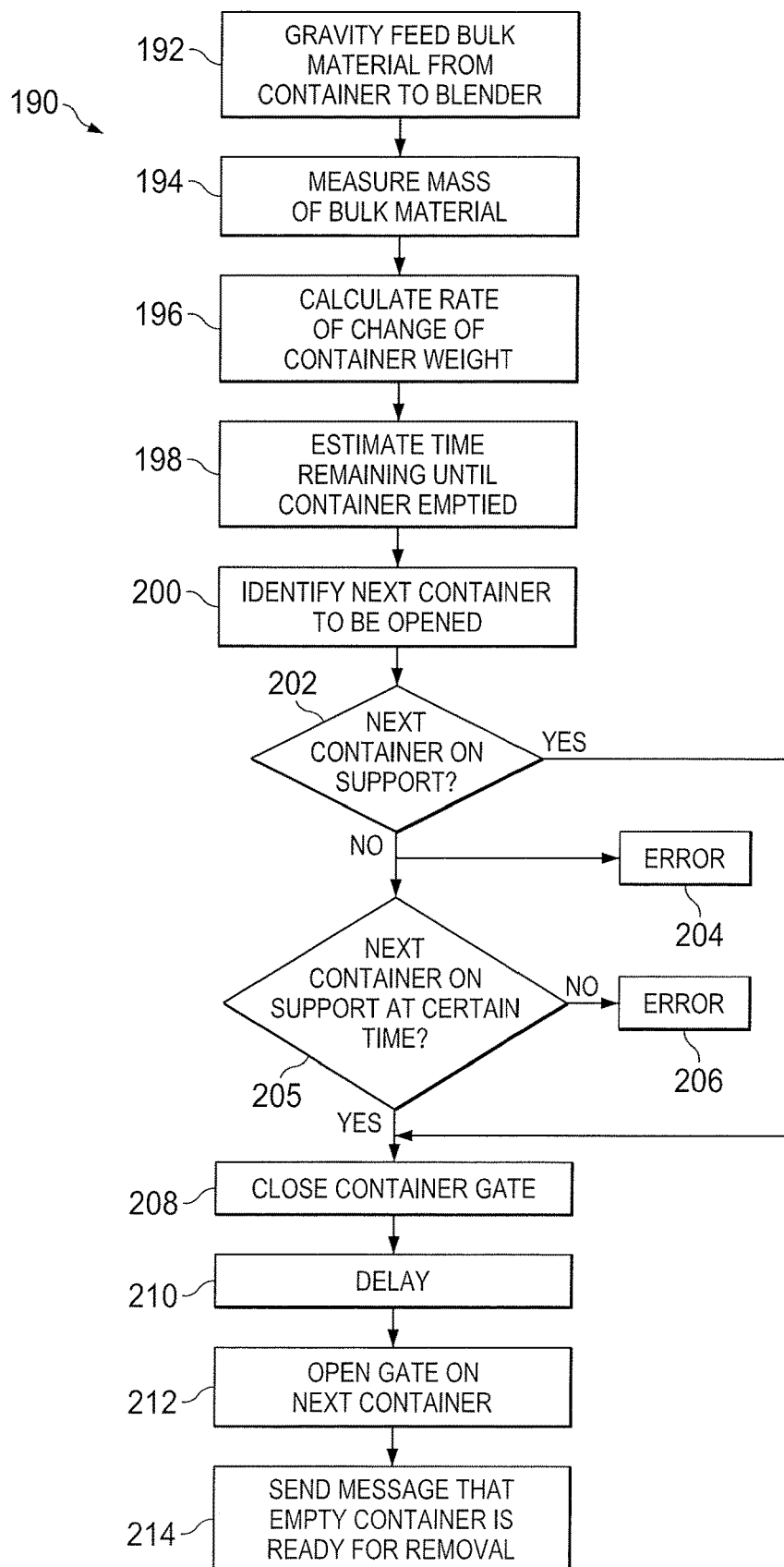
FIG. 4 is a process flow diagram of a method for sequencing a plurality of bulk material containers, in accordance with an embodiment of the present disclosure.

FIG. 4 is a process flow diagram of a method 190 for utilizing the sequencing and container control system described above, along with additional features used to successfully operate the bulk material handling system. The method 190 may include delivering (block 192) bulk material to a blender inlet via gravity from one or more portable containers (e.g., 12 of FIG. 1) that are elevated on a support structure (e.g., 14 of FIG. 1) above the level of the blender inlet.

The method 190 may also include measuring (block 194) a mass (weight) of the bulk material in each portable container disposed on the support structure in real-time using, for example, load cells (e.g., 106 of FIG. 2) or other similar technology. These load cells or other sensors may be disposed on the support structure, such that their measurements correspond to whichever portable container is currently disposed on that portion of the support structure. The control system may calculate (block 196) a rate of change of the container weight measurement, and this rate of change may be indicated to an operator via a display on the GUI (e.g., 100 of FIG. 2). In addition, the method 190 may include calculating (block 198) a predictive estimate of the time remaining before any open portable containers will be emptied. This calculation may involve, for example, linear extrapolation of the current bulk material use rate. In other embodiments, this calculation may be tied to a pre-selected blender schedule specific to the fluid treatment operation, so that a more accurate estimate of time remaining may be provided.

The method 190 may include identifying (block 200) the next container (or multiple containers) to be opened to provide a continuous flow of bulk material to the blender unit. This identification of the next container(s) happens while the bulk material is still draining out of the first container(s). In some embodiments, this identification may be an operator initiated selection made using the GUI (e.g., "next to open" button 156 of FIG. 3). In other embodiments, the identification may be made automatically by the control system in accordance with a pre-loaded job program (e.g., 112 of FIG. 2), based on sensor feedback related to the type, size, and weight of bulk material available in on-site portable containers.

In some embodiments, the control system may determine (block 202), based on sensor feedback (e.g., load cells on the support structure), whether the identified container(s) are in place on the support structure. If no container is present in the desired location of the support structure at the time the sequence is selected by the operator (or the control system), an error message (block 204) may be sent to the operator via the GUI. If no container is present in the desired location at a reasonable amount of time (e.g., 2 minutes) before the container switch is to occur (determined at block 205), an additional error message (block 206) may be sent to the operator.

When a container weight measurement reads empty, the controller may automatically close (block 208) the discharge gate on the container(s) being used, delay (block 210) a short amount of time in order to empty the corresponding discharge chute without starving the blender unit of bulk material, and automatically open (block 212) the discharge gate for the next container(s) in the sequence. When the original container is empty, and the gate has been closed, the controller may send an automated message (block 214) to the operator via the GUI indicating that this container is ready to be removed, and another container put in its place. This method 190 may be repeated multiple times throughout a treatment operation, so that a plurality of containers are switched out in an automated fashion to provide a continuous supply of desired bulk material to the outlet.

The desired time delay (210) for switching between containers may be calculated based on the current use rate of the bulk material (as determined via the calculation of block 196) and based on a known time required for the gate opening/closing to occur. In embodiments where a treatment schedule or job program has been provided to the control system, the control system may be able to predict ahead of time what delay (210) to use when switching between subsequent containers. This delay timing may change based on the scenario of the treatment job. For example, if the system is not switching between two different types of bulk material, then there is no reason to wait for the blender hopper to be drained before actuating the discharge gates. In instances where a clean break between different bulk material types is desired, the system may detect the fill level of the blender hopper and extend the timing delay (210) until most of the old bulk material has been output from the hopper before opening (212) the new container.

Different timing algorithms may be used under different scenarios to sequence the containers and determine the delay for container switching. For example, when the bulk material is being mixed in the blender unit at very high rates, the control system may provide a more automated process with faster sequencing to determine which container will be opened next. To accelerate the swap between two subsequent containers, the controller may output simultaneous, or parallel, signals to actuate the discharge gates of the containers at approximately the same time. This may reduce the total time delay experienced in the successive gate movements.

Although the present disclosure and its advantages have been described in detail, it should be understood that various changes, substitutions and alterations can be made herein without departing from the spirit and scope of the disclosure as defined by the following claims.

What is claimed is:

1. A method, comprising:
    feeding bulk material from a first portable container of a plurality of portable containers of bulk material to an outlet via a gravity feed, wherein the plurality of portable containers are separate from each other and independently transportable;
    identifying, via a controller, a second portable container from the plurality of portable containers to be opened after the first portable container in a sequence;
    outputting a first control signal to automatically close a discharge gate on the first portable container;
    outputting a second control signal to automatically open a discharge gate on the second portable container; and
    displaying data related to each of the plurality of portable containers at the same time on a GUI regardless of whether each of the plurality of portable containers is outputting bulk material, wherein the data comprises an indication of whether each portable container of the plurality of portable containers is open or closed.

2. The method of claim 1, wherein identifying the second portable container comprises receiving an operator initiated selection of the second portable container from the GUI.

3. The method of claim 2, further comprising displaying an error message on the GUI if the operator initiated selection does not correspond with a portable container that is physically in place to be opened at a predetermined time.

4. The method of claim 1, further comprising identifying the second portable container based on a pre-loaded schedule and sensor data indicative of a type or quantity of bulk material disposed in the plurality of containers.

5. The method of claim 1, wherein the data further comprises a predictive estimate of time remaining until the first portable container is emptied.

6. The method of claim 1, wherein the data further comprises an indication that the first portable container is empty and ready for removal from a support structure.

7. The method of claim 1, further comprising outputting the first and second control signals such that the discharge gate on the second portable container opens following a time delay after the discharge gate on the first portable container closes.

8. The method of claim 7, further comprising calculating the time delay based on a rate of use of bulk material at the outlet.

9. The method of claim 7, further comprising determining whether a type of bulk material is being changed between the first portable container and the second portable container, and calculating the time delay such that a minimal amount of bulk material is present in a hopper when the flow of bulk material from the second portable container arrives in the hopper.

10. The method of claim 1, further comprising outputting the first and second control signals in parallel such that the discharge gate on the second portable container opens at approximately the same time that the discharge gate on the first portable container closes.

11. The method of claim 1, wherein the data further comprises a predictive estimate of time remaining until the first portable container is emptied, an indication that the first portable container is empty and ready for removal from a support structure, or both.

12. The method of claim 7, further comprising calculating the time delay via the controller.

13. The method of claim 1, wherein the first and second control signals are output in parallel.

14. The method of claim 1, wherein the data further comprises a weight of bulk material present in each portable container of the plurality of portable containers.

15. The method of claim 1, wherein the data further comprises a rate at which any bulk material is exiting each portable container of the plurality of portable containers.

16. A method, comprising:
feeding bulk material from a first portable container of a plurality of portable containers of bulk material to an outlet via a gravity feed, wherein the plurality of portable containers are separate from each other and independently transportable;
identifying, via a controller, a second portable container from the plurality of portable containers to be opened after the first portable container in a sequence;
outputting a first control signal to automatically close a discharge gate on the first portable container;
outputting a second control signal to automatically open a discharge gate on the second portable container; and
displaying data related to each of the plurality of portable containers at the same time on a GUI regardless of whether each of the plurality of portable containers is outputting bulk material, wherein the data comprises a rate at which any bulk material is exiting each portable container of the plurality of portable containers.

17. The method of claim 16, wherein the data further comprises a predictive estimate of time remaining until the first portable container is emptied, an indication that the first portable container is empty and ready for removal from a support structure, or both.

18. The method of claim 16, wherein the data further comprises a weight of bulk material present in each portable container of the plurality of portable containers.

19. A method, comprising:
feeding bulk material from a first portable container of a plurality of portable containers of bulk material to an outlet via a gravity feed, wherein the plurality of portable containers are separate from each other and independently transportable;
identifying, via a controller, a second portable container from the plurality of portable containers to be opened after the first portable container in a sequence;
outputting a first control signal to automatically close a discharge gate on the first portable container;
outputting a second control signal to automatically open a discharge gate on the second portable container; and
displaying data related to each of the plurality of portable containers at the same time on a GUI regardless of whether each of the plurality of portable containers is outputting bulk material;
wherein the first and second control signals are output in parallel.

20. The method of claim 19, further comprising outputting the first and second control signals such that the discharge gate on the second portable container opens at approximately the same time that the discharge gate on the first portable container closes.

* * * * *